United States Patent
Kim et al.

(10) Patent No.: US 10,231,016 B2
(45) Date of Patent: Mar. 12, 2019

(54) NETWORK COOPERATION-BASED LOW POWER TYPE CHARGED BROADCASTING SET-TOP BOX AND CONTROLLING METHOD THEREFOR

(71) Applicant: ELECTRONICS AND TELECOMMUNICATIONS RESEARCH INSTITUTE, Daejeon (KR)

(72) Inventors: Young Il Kim, Daejeon (KR); Won Ryu, Seoul (KR); Young Soo Park, Daejeon (KR); Yong Tae Lee, Daejeon (KR); Eui Suk Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/509,344

(22) PCT Filed: Jul. 16, 2015

(86) PCT No.: PCT/KR2015/007416
§ 371 (c)(1),
(2) Date: Mar. 7, 2017

(87) PCT Pub. No.: WO2016/039525
PCT Pub. Date: Mar. 17, 2016

(65) Prior Publication Data
US 2017/0257668 A1     Sep. 7, 2017

(30) Foreign Application Priority Data

Sep. 11, 2014   (KR) .................. 10-2014-0120148
May 14, 2015    (KR) .................. 10-2015-0067446

(51) Int. Cl.
*H04N 21/443*     (2011.01)
*H04N 5/44*       (2011.01)
(Continued)

(52) U.S. Cl.
CPC ............ *H04N 21/443* (2013.01); *H02M 1/16* (2013.01); *H02M 3/28* (2013.01); *H04N 5/44* (2013.01);
(Continued)

(58) Field of Classification Search
None
See application file for complete search history.

(56) References Cited

U.S. PATENT DOCUMENTS 5,239,652 A * 8/1993 Seibert ................. G06F 1/3228
                                                  360/69
5,600,364 A * 2/1997 Hendricks ............. H04H 20/10
                                                  348/E5.002
(Continued)

FOREIGN PATENT DOCUMENTS

JP    2011-091547 A    5/2011
KR  10-2006-0131455 A  12/2006
(Continued)

OTHER PUBLICATIONS

TTA Standard, "IPTV Service Discovery and Transport", Telecommunications Technology Associations, Apr. 2014.
(Continued)

*Primary Examiner* — An Son P Huynh
(74) *Attorney, Agent, or Firm* — LRK Patent Law Firm

(57) ABSTRACT

A network cooperation-based low power type charged broadcasting set-top box and a controlling method therefor, the set-top box sub-dividing a standby mode of the set-top box into an active standby mode, in which only background functions are processed without processing a main function,
(Continued)

and a passive standby mode, in which no functions are processed; extending the passive standby mode occupation time to more than that of the active standby mode; and including a way of transitioning between operating modes by exchanging information regarding the set-top box through an inter-cooperation between a charged broadcasting network and the set-top box, thereby reducing the power consumption of a processor (SoC) which processes multimedia contents and minimizing the power consumption while the set-top box is in standby mode.

14 Claims, 9 Drawing Sheets

(51) Int. Cl.
*H04N 5/63* (2006.01)
*H04N 21/24* (2011.01)
*H04N 21/2543* (2011.01)
*H04N 21/258* (2011.01)
*H04N 21/40* (2011.01)
*H04N 21/472* (2011.01)
*H02M 1/16* (2006.01)
*H02M 3/28* (2006.01)
*H04N 7/173* (2011.01)
*H04N 21/4227* (2011.01)

(52) U.S. Cl.
CPC .............. *H04N 5/63* (2013.01); *H04N 7/173* (2013.01); *H04N 21/24* (2013.01); *H04N 21/2543* (2013.01); *H04N 21/25833* (2013.01); *H04N 21/40* (2013.01); *H04N 21/4227* (2013.01); *H04N 21/4436* (2013.01); *H04N 21/47211* (2013.01)

(56) References Cited

U.S. PATENT DOCUMENTS

| | | | | |
|---|---|---|---|---|
| 6,286,140 B1* | 9/2001 | Ivanyi | ............ | H04H 60/33 348/E5.096 |
| 6,807,188 B1* | 10/2004 | Blahut | ............ | H04J 3/0682 348/E7.07 |
| 9,189,049 B2* | 11/2015 | Kumar | ............ | G06F 1/3203 |
| 9,846,471 B1* | 12/2017 | Arora | ............ | G06F 1/3231 |
| 9,883,236 B2* | 1/2018 | Kang | ............ | H04H 20/08 |
| 2003/0103168 A1* | 6/2003 | Lamb | ............ | H04N 5/44582 348/734 |
| 2003/0115589 A1* | 6/2003 | D'Souza | ............ | H04H 60/43 725/10 |
| 2003/0117445 A1* | 6/2003 | Hendricks | ............ | H04H 20/91 715/810 |
| 2004/0085894 A1* | 5/2004 | Wang | ............ | H04L 41/0663 370/216 |
| 2005/0028208 A1* | 2/2005 | Ellis | ............ | H04N 7/163 725/58 |
| 2005/0149964 A1* | 7/2005 | Thomas | ............ | G06Q 30/02 725/9 |
| 2005/0183130 A1* | 8/2005 | Sadja | ............ | H04N 7/17309 725/107 |
| 2006/0242665 A1* | 10/2006 | Knee | ............ | H04N 5/44543 725/38 |
| 2007/0038344 A1* | 2/2007 | Oota | ............ | B60R 25/2009 701/49 |
| 2007/0040947 A1* | 2/2007 | Koga | ............ | H04N 5/63 348/725 |
| 2007/0157281 A1* | 7/2007 | Ellis | ............ | H04N 7/17309 725/134 |
| 2007/0268403 A1* | 11/2007 | Oda | ............ | H04N 5/63 348/460 |
| 2009/0138734 A1* | 5/2009 | Uchida | ............ | G06F 1/266 713/310 |
| 2009/0195349 A1* | 8/2009 | Frader-Thompson | ............ | G01D 4/002 340/3.1 |
| 2010/0031297 A1* | 2/2010 | Klein | ............ | H04L 12/12 725/78 |
| 2010/0079597 A1* | 4/2010 | Stokes | ............ | H04H 60/32 348/184 |
| 2011/0069940 A1* | 3/2011 | Shimy | ............ | G11B 27/105 386/296 |
| 2011/0078717 A1* | 3/2011 | Drummond | ............ | H04N 21/4586 725/14 |
| 2011/0131623 A1 | 6/2011 | Kang et al. | | |
| 2011/0138064 A1* | 6/2011 | Rieger | ............ | G06F 17/30905 709/228 |
| 2011/0145876 A1 | 6/2011 | Choi et al. | | |
| 2011/0150431 A1* | 6/2011 | Klappert | ............ | H04N 7/163 386/296 |
| 2011/0171937 A1* | 7/2011 | Hill | ............ | H04B 5/0031 455/412.2 |
| 2011/0197243 A1* | 8/2011 | Kuo | ............ | H04L 12/2801 725/110 |
| 2011/0208803 A1* | 8/2011 | McCoy | ............ | H04L 41/0681 709/203 |
| 2011/0317078 A1* | 12/2011 | Johns | ............ | H04N 5/63 348/730 |
| 2012/0066706 A1* | 3/2012 | Setos | ............ | G06Q 30/02 725/14 |
| 2012/0137146 A1* | 5/2012 | Karanth | ............ | G06F 1/3209 713/310 |
| 2012/0197448 A1* | 8/2012 | Shin | ............ | G06Q 10/06 700/286 |
| 2012/0209961 A1* | 8/2012 | McCoy | ............ | H04N 21/4333 709/219 |
| 2012/0266006 A1* | 10/2012 | Chen | ............ | G06F 11/2284 713/340 |
| 2012/0331084 A1* | 12/2012 | Chang | ............ | H04L 67/2842 709/213 |
| 2013/0139195 A1* | 5/2013 | Ciciora | ............ | H04N 21/44008 725/19 |
| 2013/0179698 A1* | 7/2013 | Woods | ............ | H04N 21/42209 713/300 |
| 2013/0242202 A1* | 9/2013 | Shintani | ............ | H04N 21/426 348/730 |
| 2013/0247117 A1* | 9/2013 | Yamada | ............ | G08C 17/02 725/93 |
| 2013/0315150 A1* | 11/2013 | Koskinen | ............ | H04L 41/5064 370/328 |
| 2014/0018969 A1* | 1/2014 | Forbes, Jr. | ............ | H02J 3/32 700/295 |
| 2014/0047495 A1* | 2/2014 | Yun | ............ | H04N 5/63 725/132 |
| 2014/0075464 A1* | 3/2014 | McCrea | ............ | G06F 19/3418 725/14 |
| 2014/0112408 A1* | 4/2014 | Ecker | ............ | H04W 52/0229 375/271 |
| 2014/0203862 A1* | 7/2014 | Wang | ............ | G06F 1/3246 327/434 |
| 2014/0308919 A1* | 10/2014 | Baranov | ............ | H04W 12/10 455/410 |
| 2014/0344289 A1* | 11/2014 | Berenson | ............ | G06F 1/3293 707/751 |
| 2015/0095927 A1* | 4/2015 | NaikRaikar | ............ | H04N 21/44222 725/14 |
| 2015/0127122 A1* | 5/2015 | Kwon | ............ | H04L 12/12 700/22 |
| 2015/0237567 A1* | 8/2015 | Xue | ............ | H04W 48/16 455/552.1 |
| 2015/0358669 A1* | 12/2015 | Seo | ............ | H04N 21/42676 725/111 |
| 2016/0105847 A1* | 4/2016 | Smith | ............ | H04L 67/125 370/252 |

(56) References Cited

U.S. PATENT DOCUMENTS

2016/0119181 A1* 4/2016 Suzuki ................ H04L 43/0817
　　　　　　　　　　　　　　　　　　　　　　709/223
2017/0320464 A1* 11/2017 Schultz .................. B60R 25/00

FOREIGN PATENT DOCUMENTS

| KR | 10-2008-0017703 A   | 2/2008  |          |
|----|---------------------|---------|----------|
| KR | 10-2010-0045266 A   | 5/2010  |          |
| KR | 10-2010-0065458 A   | 6/2010  |          |
| KR | 10-2012-0116729 A   | 10/2012 |          |
| KR | 10-1387369 B1       | 4/2014  |          |
| KR | 10-2014-0102472 A   | 8/2014  |          |
| KR | 20160007081 A *     | 1/2016  |          |
| WO | WO-2012022996 A1 *  | 2/2012  | ........... G06F 1/3228 |

OTHER PUBLICATIONS

Search Report dated Oct. 28, 2015 for International Application No. PCT/KR2015/007416.
Written Opinion dated Oct. 28, 2015 for International Application No. PCT/KR2015/007416.

* cited by examiner

(1) SET TOP BOX POWER MANAGEMENT SERVER(900) → SET TOP BOX(1000)

| UNIQUE ADDRESS OF SET TOP BOX | OPERATION MODE SHIFTING COMMAND | CURRENT OPERATION MODE | SHIFTING OPERATION MODE | 타이머 값 | RESET COMMAND |
|---|---|---|---|---|---|
|  | 1 | 0 | 1 1 | 1 0 | 1 |
|  | 0:MAINTAIN 1:SHIFT | 00:ON 01:ACTIVE STANDBY 10:PASSIVE STANDBY | 00:ON 01:ACTIVE STANDBY 10:PASSIVE STANDBY | Ton:ON Tap:ACTIVE STANDBY Tps:PASSIVE STANDBY | 0:MAINTAIN 1:RESET |

OPERATION STATUS

0:NORMAL 1:ABNORMAL

(2) SET TOP BOX(1000) → SET TOP BOX POWER MANAGEMENT SERVER(900)

| UNIQUE ADDRESS OF SET TOP BOX | OPERATION STATUS |  |
|---|---|---|
|  | 0 1 | 1 |
|  | 00:ON 01:ACTIVE STANDBY 10:PASSIVE STANDBY | 0:NORMAL 1:ABNORMAL |

F I G . 3

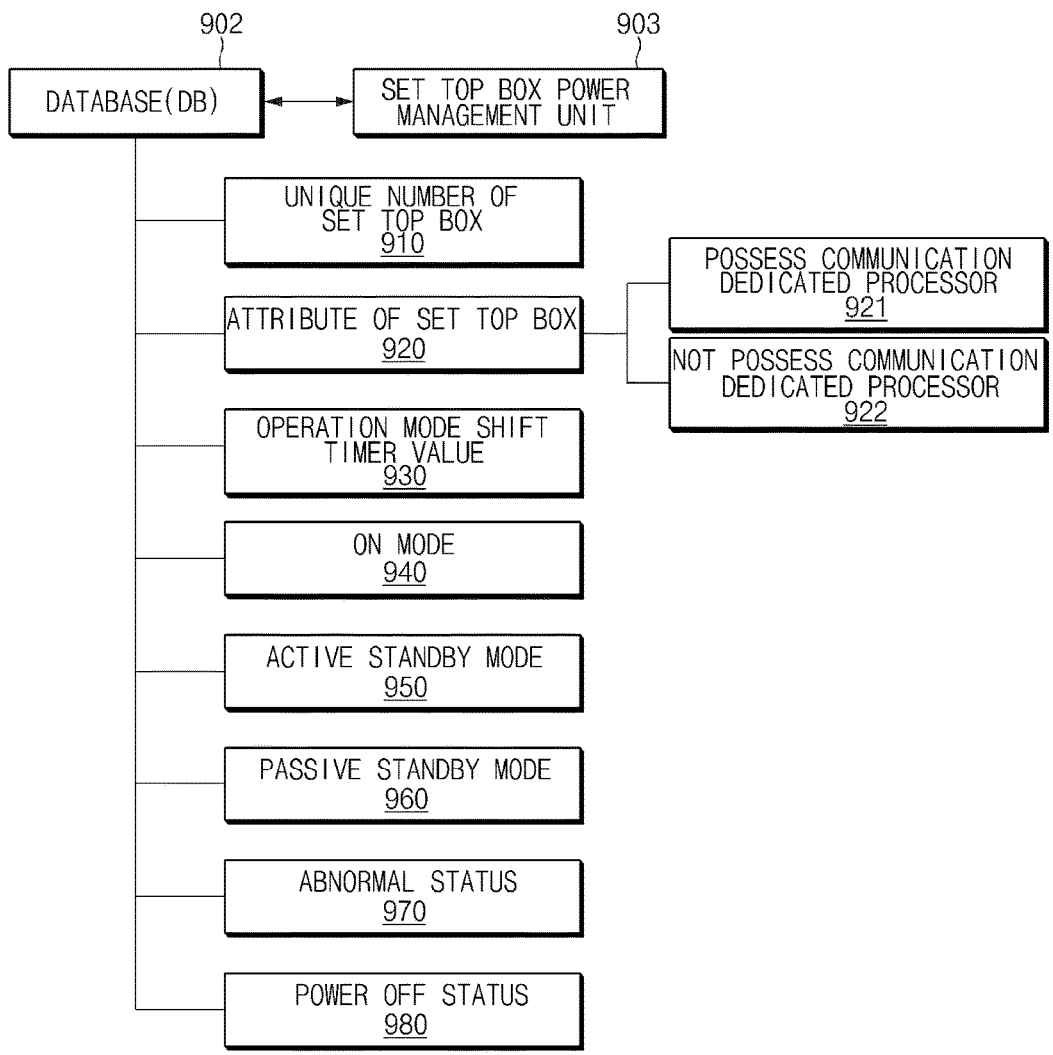
F I G. 6

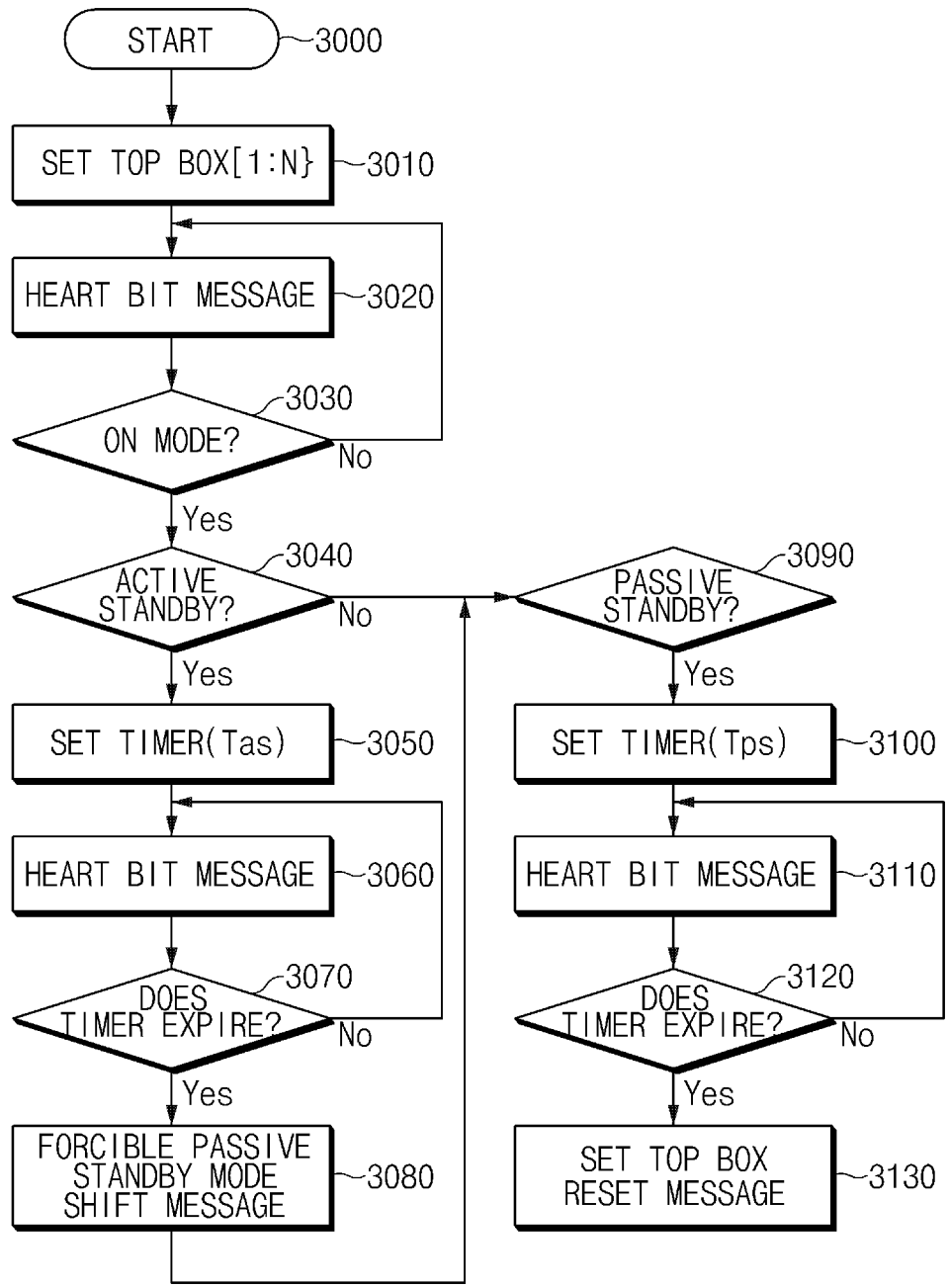
F I G. 7

NETWORK COOPERATION-BASED LOW POWER TYPE CHARGED BROADCASTING SET-TOP BOX AND CONTROLLING METHOD THEREFOR

CROSS-REFERENCE TO RELATED APPLICATION(S)

The present application is a U.S. National Phase entry from International Application No. PCT/KR2015/007416, filed Jul. 16, 2015, which claims priority to Korean Patent Application Nos. 10-2014-0120148 and 10-2015-0067446, filed Sep. 11, 2014 and May 14, 2015, respectively, the disclosures of which are incorporated by reference herein in their entireties.

BACKGROUND OF THE INVENTION

1. Field of the Invention

The present invention relates to a pay TV set top box, and more particularly, to a control method of a set top box which minimizes power consumption of a set top box through cooperation between a pay TV network and the set top box, thereby reducing power consumption of the set top box which receives contents of the pay TV network.

2. Description of Related Art

Almost tens of millions of set top boxes for pay TV consume lots of power so that the set top boxes are considered as a major target to be managed in view of national power supply and demand. As seen from a present situation of a pay TV watching pattern, a time share of the set top box is higher in a standby mode than in an operation mode so that it is necessary to introduce a method for reducing power consumption in the standby mode. As described above, the standby mode is roughly classified into an active standby mode and a passive standby mode and in the active standby mode, a function required to process a broadcasting protocol for watching pay TV and update an electronic program guide is performed, so that more power is consumed in the active standby mode, than in the passive standby mode.

SUMMARY OF THE INVENTION

The present invention has been made in an effort to provide a low power pay TV set top box based on network cooperation, which optimizes a shift between an active standby mode and a passive standby mode, in a standby mode through cooperation between a pay TV network and a set top box and manages statuses of individual set top boxes in the network to minimize power consumption of the set top box and a control method thereof.

Further, to this end, the present invention provides a low power pay TV set top box based on network cooperation which subdivides a standby mode of the set top box into an active standby mode in which a main function is not processed but only a background function is processed and a passive standby mode in which all functions are not performed and includes a method which exchanges information on a set top box through cooperation between a pay TV network and the set top box to shift the operation mode to expand a time share of the passive standby mode to be larger than that of the active standby mode, thereby reducing power consumption of a processor (SoC) which processes multimedia contents and minimizing power consumption during the standby mode of the set top box and a control method thereof.

Technical objects of the present invention are not limited to the aforementioned technical objects and other technical objects which are not mentioned will be apparently appreciated by those skilled in the art from the following description.

According to an aspect of the present invention, a set top box control method based on network cooperation includes: periodically transmitting, by one or more set top boxes, a message indicating an operation status of the set top box in accordance with a message generation cycle set in accordance with a control message received from a power management server on a network to the power management server; periodically transmitting, by the power management server, the control message to the set top box in accordance with the generation cycle of the control message, managing the operation status information for each set top box in accordance with a message indicating the operation status of the set top box received from the set top box in a database, and monitoring the operation status of the set top box in accordance with the control message; and when the generation period expires but a message indicating the operation status of the set top box corresponding to the current operation mode of the set top box is not received or another event occurs, transmitting, by the power management server, a message for shifting the operation mode to the set top box and shifting, by the set top box, the operation mode in accordance with the message.

The operation mode of the set top box may include an on mode and an off mode and further include an active standby mode and a passive standby mode depending on whether to support a background function.

The passive standby mode may include a standalone passive standby mode and a network connected passive standby mode which maintains a communication status with a network device including the power management server in accordance with the operation of the communication dedicated processor of the set top box.

A message for the operating status of the set top box which is transmitted from the set top box may include information on a set top box unique address, a current operation mode, or a normal or abnormal operation status.

The control message which is transmitted from the power management server may include information on a set top box unique address, an operation mode shifting command of the set top box, a current operation mode, an operation mode to be shifted, a timer value for a shifting time of the operation mode or the generation cycle, a set top box reset command, or information on a normal or abnormal operation status of the set top box.

The shifting of the operation mode may include shifting, by the set top box, the mode into other operation modes among the on mode, the active standby mode, or the passive standby mode in accordance with the message when the power management server does not receive a message on any one operation status among the on mode, the active standby mode, and the passive standby mode of the set top box.

The shifting of the operation mode may include performing, by the set top box, a resetting process of turning off the all power devices and rebooting the devices in accordance with the message when the power management server does not receive the message on the operation status of the network connected passive standby mode of the set top box.

According to the set top box control method based on the network cooperation, the power management server may remotely control the set top box on the network to operate in the active standby mode longer than in the passive standby mode to reduce the power consumption of the set top box.

The set top box control method based on the network cooperation may further include shifting, by the set top box, the operation mode in accordance with the timer time and the operation mode which is input by manipulating the remote controller by the user.

The set top box control method based on the network cooperation may further include transmitting, by the power management server, a message including a timer time information to update electronic program guide (EPG) information or the firmware and control the set top box to shift the passive standby mode into the active standby mode at the corresponding time, and then transmitting the traffic after the time, to control the set top box to update the EPG information or the firmware.

The set top box control method based on the network cooperation may further include obtaining, by the set top box power management server, watching pattern information including a time zone when the TV is watched in the set top box, a program genre, or a watching time length, transmits a message including the operation time information for a predetermined operation mode of the set top box obtained by analyzing and calculating the broadcast time of the program which is expected to be watched by the user to the set top box, setting the time to a timer in the set top box, and shifting the operation mode into the on mode, the active standby mode, or the passive standby mode when the set time of the timer expires.

Another aspect of the present invention provides, a set top box power management device for controlling a set top box based on network cooperation, including: a database which stores operation status information for one or more set top boxes on the network; and a set top box power management unit which interworks with the set top box to periodically exchange a message, periodically transmits a control message to the set top box in accordance with a generation cycle of the control message, receives a message on the operation status of the set top box which is periodically transmitted by the set top box in accordance with a message generation cycle set in accordance with the control message to manage the operation status information for the set top box by the database and monitor the operation status of the set top box in accordance with the control message, in which when the set top box power management unit does not receive the message on the operation status of the set top box corresponding to the current operation mode of the set top box at a time when the generation cycle expires, with reference to the database, or another event occurs, the set top box power management unit transmits a message for shifting the operation mode to the set top box.

The set top box power management unit, when a message on any one operation status of the on mode, the active standby mode, and the passive standby mode of the set top box is not received, may transmit a message which shifts the operation mode of the set top box into other operation modes among the on mode, the active standby mode, and the passive standby mode to the set top box.

When the set top box power management unit does not receive a message on an operation status of a network connected passive standby mode of the set top box, the set top box power management unit may transmit a message which allows the set top box to perform a reset process which turns off all power devices and then reboots the devices to the set top box.

The set top box power management unit may transmit a message including timer time information to control the set top box to be shifted from the passive standby mode into the active standby mode at the time in the set top box and then transmit the traffic after the time, so that the set top box is controlled, to update the EPG information or the firmware.

The set top box power management unit may obtain watching pattern information including a time zone when the TV is watched in the set top box, a program genre, or a watching time length including a watching time length, transmit a message including the operation time information for a predetermined operation mode of the set top box obtained by analyzing and calculating the broadcast time of the program which is expected to be watched by the user to the set top box, controls the set top box to set the time in a timer and shift the operation mode into the on mode, the active standby mode, or the passive standby mode when the set time of the timer expires.

Yet another aspect of the present invention provides a set top box based on network cooperation, including a timer; and a power management unit which interworks with a power management server on a network to periodically exchange the message and periodically transmit a message on the operation status of the set top box in accordance with a message generation cycle set in the timer in accordance with a control message received from the power management server, in which the power management unit includes a timer setting block which sets the message generating cycle in the timer in accordance with the control message; and a power control block which controls the power device for the mode, in accordance with a message for shifting a transmitted operation mode, when a message on the operation status of the set top box corresponding to the current operation mode of the set top box is not received when the generation cycle of the control message expires or another event occurs in the power management server which receives a message on the operation status of the set top box to manage the message in the database, monitors the operation state of the set top box in accordance with the control message.

Advantageous Effects

According to the low power pay TV set top box based on network cooperation and a control method thereof according to the present invention, when it is required to update an EPG or an abnormal heart bit message in the active standby mode is received, or in accordance with a service request, watching patterns of a user is analyzed to be shifted from the active standby mode (a background function such as broadcasting protocol processing or EPG updating is available) to the passive standby mode (the main function and the background function are not allowed) at the corresponding time, to extend a time to maintain the passive standby mode in which power consumption is low to be longer than that of the active standby mode, thereby reducing average power consumption in the standby mode of the set top box. Therefore, plant building may be reduced nation-wide.

Further, service providers remotely control set top boxes of subscribers in a pay TV network, so that power consumption of the set top box may be reduced as described above and abnormality of the set top box is discovered and handled at an early stage, so that total benefit may be increased.

BRIEF DESCRIPTION OF THE DRAWINGS

FIG. 3 illustrates a heart bit message type for cooperation between a device on a pay TV network according to an exemplary embodiment of the present invention and a set top box.

FIG. 6 illustrates a data structure for managing a status of a set top box in a set top box power management server which interworks with a set top box based on network cooperation according to an exemplary embodiment of the present invention.

FIG. 7 is a flowchart explaining an operational procedure for managing a status of a set top box in a set top box power management server according to an exemplary embodiment of the present invention.

DETAILED DESCRIPTION OF THE INVENTION

Figure 1:
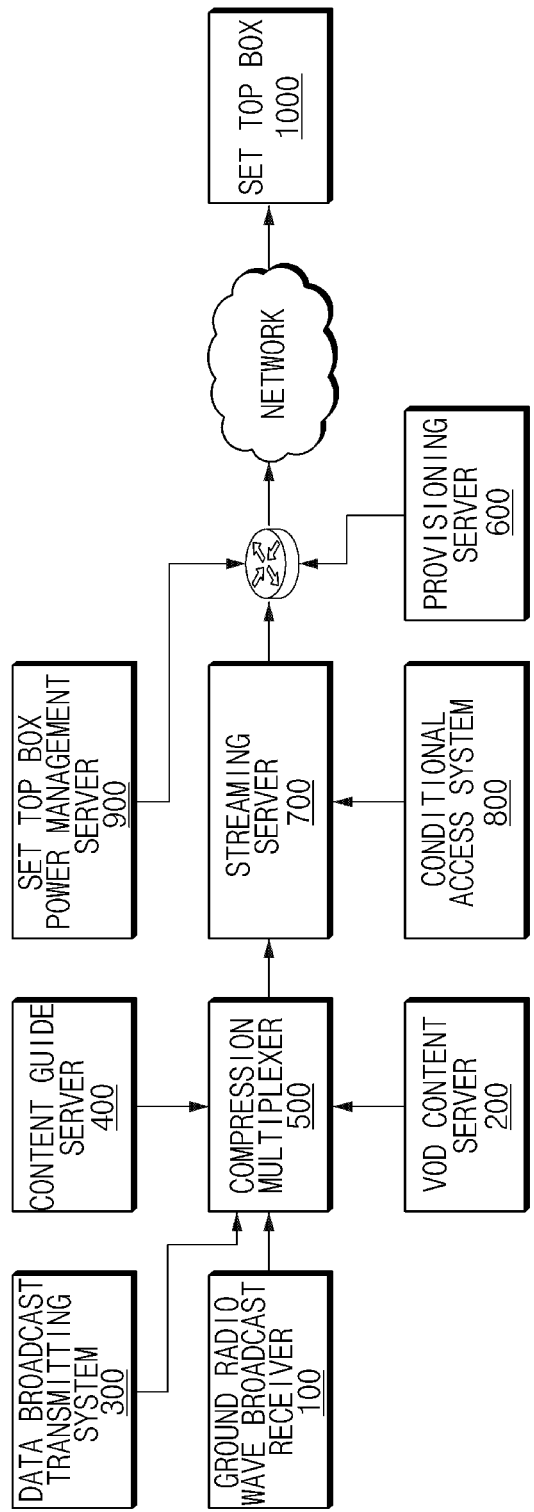
FIG. 1 is a view explaining devices which interwork on a pay TV network according to an exemplary embodiment of the present invention.

Hereinafter, some embodiments of the present invention will be described in detail with reference to the accompanying drawings. In the figures, even though the like parts are illustrated in different drawings, it should be noted that like reference numerals refer to the same parts of the present invention. In describing the exemplary embodiments of the present invention, when it is determined that the detailed description of the known configuration or function related to the present invention may obscure the understanding of embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature or an order of the component is not limited by the terminologies. If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideal or excessively formal meaning if they are not clearly defined in the present invention.

First, a set top box required to watch pay TV needs to receive recent information (EPG: electronic program guide) on contents which are provided by the pay TV service provider and provide the information to the user. The user searches desired contents based on the information to receive the service. To this end, the set top box needs to receive the EPG information provided by the broadcasting service provider even in the standby mode to perform a series of functions for consistently updating the contents.

Accordingly, as described above, an operation mode of the set top box is configured by an on mode (or an active mode) in which broadcast is received to transmit a video/audio signal to a TV set to simultaneously support a main function through which a pay TV is watched or a background function, an active standby mode which is a state which is switched to other modes by a remote controller or an internal/external signaling and performs only a background function (for example, which updates an EPG/firmware) rather than the main function, a passive standby mode is a state in which the mode is switched by a remote controller or an auto-power down (APD) function and cannot perform the main function and the background function and is switched into other modes by the remote controller input or the internal/external signaling, and an off mode in which the power is turned off. Recently, in order to meet the demands for low power consumption of the set top box, a multimedia SoC with a communication dedicated processor (micro CPU) therein in which only a network communication function is performed also in the passive standby mode is released, so that usage of the passive standby mode is increased.

In the meantime, for low power consumption of the set top box, generally, a standby mode of the set top box in which a user does not watch the contents is subdivided into an active standby mode and a passive standby mode to control an operating state of a multimedia processor. In the active standby mode, the set top box is maintained to be connected to a pay TV network and a background function of processing a broadcasting protocol or updating the EPG is performed, so that a predetermined amount of power is consumed. In contrast, the passive standby mode in which a main function of providing multimedia to the user and a background function are not provided by the set top box is roughly classified into a standalone (independent) passive standby mode which is shifted into the active standby mode and the on mode by an operation of a remote controller and a timer in a state when communication is disconnected between the set top box and the pay TV network and a network connected passive standby mode (which may be shifted to the active standby mode and the on mode) in which a communication state with network equipment is maintained by an operation of a communication dedicated low power processor (see communication dedicated low power processor 1130 of FIG. 2). In the passive standby mode, the main function and the background function are not performed, so that power consumption of the set top box is minimized.

The present invention suggests a method which exchanges information on the set top box through cooperation between the pay TV network and the set top box to shift the operation mode in order to optimize a mode shift between the active standby mode and the passive standby mode, thereby maintaining the passive standby mode of the set top box as long as possible to reduce power consumption of the set top box.

FIG. 1 is a view explaining devices which interwork on a pay TV network according to an exemplary embodiment of the present invention.

Referring to FIG. 1, a set top box 1000 according to an exemplary embodiment of the present invention is supported by communication equipment such as a router on a pay TV network to interwork with various servers on the network and specifically, interworks with network equipment of a pay TV service provider to receive pay TV contents and provide a pay TV content service to a subscriber through a TV set.

In the present invention, the pay TV network includes a wired/wireless Internet, a mobile communication network, and a satellite network and the set top box 1000 supports to receive pay TV contents for any one or more media such as IPTV, CATV, satellite TV and provides a pay TV content service to a subscriber through the TV set.

The network equipment of the pay TV service provider which interworks with the set top box 1000 through the pay TV network may include a ground radio wave broadcast receiver 100 which receives a ground radio wave broadcast (contents) to retransmit the ground radio wave broadcast to the set top boxes 1000 of charged subscribers, a video on demand (VoD) content server 200 which provides a video on demand service to the set top box 1000, a data broadcast transmitting system 300 which transmits various but additional digital information to the set top boxes 1000 of charged TV subscribers, a content guide server 400 which provides information (EPG: electronic program guide) of a broadcast program on contents which are provided by a pay TV service provider to the set top box 1000, a compression multiplexer 500 which compresses the above contents and multiplexes the broadcast information such as the digital additional information and information of the broadcast program, a provisioning server 600 which performs a procedure for interworking a broadcast network to the set top box 1000 of the charged TV subscriber, a conditional access system 800 which performs authentication to provide the broadcast service only to the set top box 1000 of a permitted subscriber, a streaming server 700 which processes a protocol to transmit a traffic between the set top box 1000 of the subscriber and the network equipment of the pay TV service provider, and a set top box power management server 900 which manages status information of the set top box 1000 to manage power consumption of the set top boxes 1000 of the subscribers.

Figure 2:
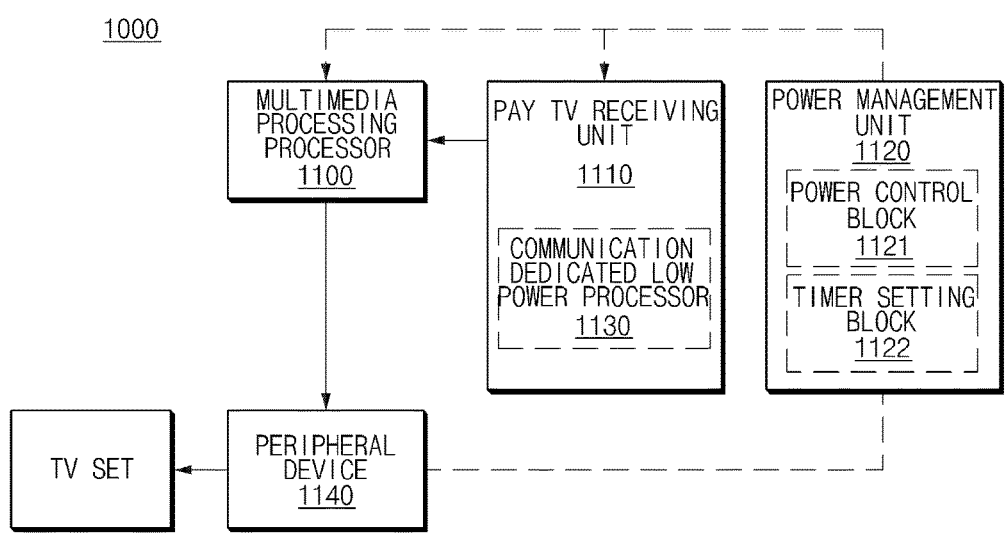
FIG. 2 is a block diagram specifically illustrating a set top box based on network cooperation according to an exemplary embodiment of the present invention.

FIG. 2 is a block diagram specifically illustrating a set top box 1000 based on network cooperation according to an exemplary embodiment of the present invention.

As illustrated in FIG. 2, the set top box 1000 according to the exemplary embodiment of the present invention includes a multimedia processing processor 1100, a pay TV receiving unit 1110, a power management unit 1120, and a peripheral device 1140 in order to provide a pay TV contents service to the subscriber through a TV set. The peripheral device 1140 includes a power supply which supplies power to the set top box such as a power device for a background function of the set top box and a power device for a main function of the set top box and further, may include an apparatus which performs auxiliary functions to provide pay TV contents such as a memory which stores various settings or information, a video/audio driver which transmits a video/audio driving signal to the TV set, and a subscriber identifier which authenticates a subscriber using an authentication card/authentication input information.

The pay TV receiving unit 1110 receives a broadcast signal for pay TV contents which is broadcasted in the network equipment of the pay TV service provider as illustrated in FIG. 1, such as the streaming server 700.

In the meantime, as described above, the set top box 1000 operates in four or more operation modes such as the on mode (1150 in FIG. 4), the active standby mode (1160 in FIG. 4), the passive standby mode (1170 in FIG. 4), and the off mode. Here, the passive standby mode is classified into a standalone (independent) passive standby mode which is shifted to the active standby mode and the on mode by an operation of a remote controller and a timer in a state where communication is disconnected between the set top box 1000 and the network equipment of the pay TV service provider on the pay TV network and a network connected passive standby mode which maintains a communication state with the network equipment by the operation of the communication dedicated low power processor 1130.

The communication dedicated low power processor 1130 provided in the pay TV receiving unit 1110 supports a communication function between the set top box 100 and the pay TV network equipment in order to support the network connected passive standby mode.

The multimedia processing processor 1100 restores video and audio signals from the received broadcast signal.

The power management unit 1120 includes a power control block 1121 which controls the power device of the set top box 1000 and a timer setting block 1122 which controls the operation mode (the on mode, the active standby mode, the passive standby mode, and the off mode), thereby reducing the power consumption. The power management unit 1120 periodically transmits a message indicating an operating status of the set top box 1000 to the set top box power management server 900 in accordance with a message generating cycle which is set in the timer by the timer setting block 1122 in accordance with the control message (heart bit message) received from the set top box power management server 900 on the network.

FIG. 3 illustrates a heart bit message type for cooperation between a device on a pay TV network according to an exemplary embodiment of the present invention and a set top box 1000. The set top box 1000 may periodically exchange the heart bit message as illustrated in FIG. 3 with the set top box power management server 900 on the pay TV network, thereby reducing power consumption.

As illustrated in FIG. 3, the heart bit message which is transmitted from the set top box power management server 900 to the set top box 1000 to control the power includes information such as a set top box unique address (for example, a MAC address), an operation mode shift command of the set top box (for example, one bit), a current operation mode (for example, two bits), and an operation mode to be shifted (for example, two bits), a time to shift the operation mode after the set top box receives the message or a timer value (for example, a generation cycle Ton in the on mode, a generation cycle Tas in the active standby mode, and a generation cycle Tps in the passive standby mode) indicating a generation cycle of the heart bit message transmitted by the set top box 1000, a set top box reset command (for example, one bit), or a normal/abnormal operation state (for example, one bit) of the current set top box which is determined by the set top box power management server 900.

Further, the heart bit message which is transmitted from the set top box 1000 to the set top box power management server 900 to control the power includes information on the set top box unique address (for example, the MAC address), a current operation mode (for example, two bits), and a normal/abnormal operation state (for example, one bit) of the set top box.

As described above, it is possible to consistently manage the operation mode shift state of the set top box 1000 on the network through a procedure of periodically exchanging the heart bit message including the operation state between the set top box power management server 900 and the set top box 1000 to control the power of the set top box 1000. For example, when the set top box power management server 900 detects the abnormal status of the set top box 1000 in accordance with the operation status information of the set top box, it is possible not only to return the state to the normal state through the heart bit message but also to control the operation for reducing power consumption. When the communication dedicated low power processor 1130 is not provided in the set top box 1000, if the set top box is not in the on mode and the active standby mode, the set top box power management server 900 estimates that the set top box is in the passive standby mode to transmit the heart bit message including information of the timer value described above to control the set top box 1000 to operate in the on mode or the active standby mode.

Figure 4:
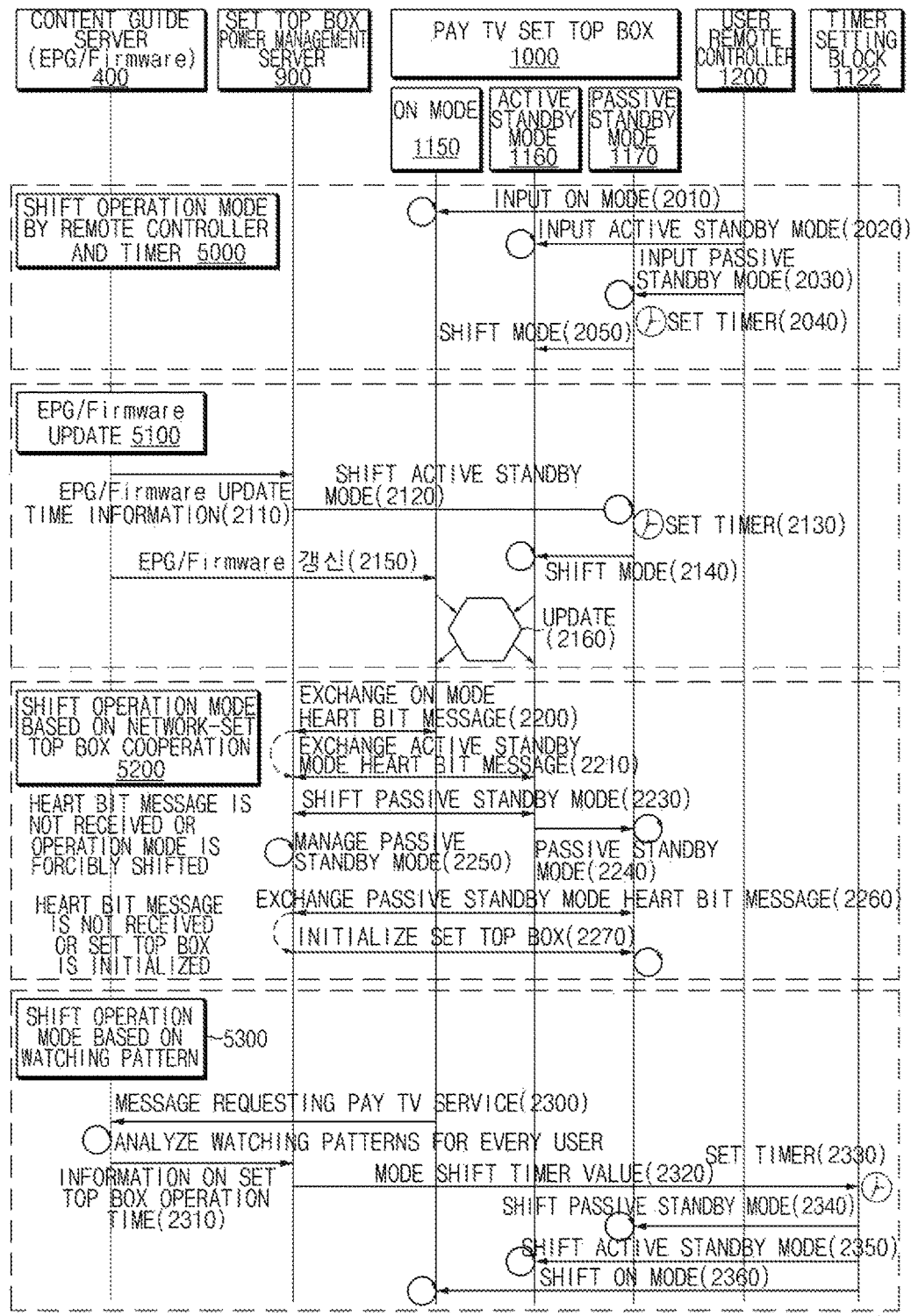
FIG. 4 is a flowchart explaining an operation mode shifting process of the set top box based on network cooperation according to an exemplary embodiment of the present invention.

FIG. 4 is a flowchart explaining an operation mode shifting process of the set top box 1000 based on network cooperation according to an exemplary embodiment of the present invention.

First, in an example 5000 of an operation mode shift by a remote controller 1200 and a timer according to the present invention, a user manipulates the remoter controller 1200 to set the set top box 1000 to shift an operation mode. For example, the user manipulates the remote controller 1200 to input the on mode 1150 (2010), input the active standby mode 1160 (2020), and input the passive standby mode 1170 (2030) and a timer setting block 1122 operates in accordance with an input in each mode to set an operation time for the timer provided in the set top box 1000 (2040) to shift an arbitrary mode into other modes at the corresponding time. Specifically, in accordance with the time set to the timer, the passive standby mode 1170 of the set top box 1000 may be shifted into the active standby mode 1160 (2050).

Further, in an example (5100) of updating an EPG or a firmware, when it is required to update the EPG or the firmware of the set top box 1000, a content guide server 400 which manages the EPG and the firmware for the set top box 1000 may transmit time information for updating the EPG or the firmware to the set top box power management server 900 (2110). In this case, when the set top box 1000 is in the passive standby mode, the set top box power management server 900 may transmit the timer time information (the heart bit message may be used) to shift the mode into the active standby mode to the set top box 1000 (2120). Therefore, the timer setting block 1122 of the set top box 1000 sets a timer to shift the operation mode at the corresponding time (2130) and the timer operates at the time so that the power control block 1121 controls target devices such as the power device to be turned on/off to shift the passive standby mode 1170 into the active standby mode 1160 (2140). Thereafter, the content guide server 400 transmits a traffic for updating the EPG or the firmware to the set top box 1000 (2150) and thus the set top box 1000 updates EPG or firmware information of the memory by the multimedia processing processor 1100 (2160). In this case, when the power supply of the set top box 1000 is turned off or the communication dedicated low power processor 1130 is not supported in the passive standby mode 1170, the power supply of the set top box 1000 is shifted into the on state by the user or after the timer (Tps: timer passive standby) expires in the time setting state described above to be shifted from the passive standby mode 1170 into the active standby mode 1160 or the on mode 1150, the content guide server 400 transmits the traffic for updating the EPG or the firmware to the set top box 1000 so that the EPG or firmware information of the set top box 1000 may be updated.

Further, in an example (5200) of shifting the operation mode based on the cooperation of the set top box power management server 900 and the set top box 1000 on the network, the set top box power management server 900 and the set top box 1000 exchanges the on mode heart bit message in the on mode 1150 to periodically share the status information (2200). For example, the set top box power management server 900 transmits the on mode heart bit message including information on the timer value Ton (timer on) notifying the current operation mode, the shift operation mode which is the on mode (for example, 00), and the generation cycle of the on mode heart bit message to the set top box 1000 and the set top box 1000 transmits the heart bit message including information on whether to be the normal operation status and the on mode operation mode to the set top box power management server 900.

In the active standby mode 1160, the set top box power management server 900 and the set top box 1000 periodically exchange the active standby mode heart bit message to share the status information (2210). For example, the set top box power management server 900 transmits the active standby mode heart bit message including information on the timer value Tas (timer active standby) notifying the current operation mode, the shift operation mode which is the active standby mode (for example, 01), and the generation cycle of the active standby mode heart bit message to the set top box 1000 and the set top box 1000 transmits the heart bit message including information on whether to be the normal operation status and the active standby mode to the set top box power management server 900.

In the on mode or the active standby mode, even though the message exchanging operation (2200 and 2210) is managed to be normally performed, when the message exchanging operation (2200 and 2210) are not normally performed due to an error on the network, the set top box power management server 900 may not receive the heart bit message from the set top box 1000 during a predetermined time within a given cycle. Further, even though the message exchanging operation (2200 and 2210) is normally performed, a case (event) where the operation mode of the set top box 1000 needs to be forcibly shifted may occur due to the system operation or in accordance with necessity of an operator or a user. In this case, the set top box power management server 900 may transmit the forcible shift message (for example, including information on the shift operation mode such as the on mode, the active standby mode, the passive standby mode) (see the shift operation mode of the heart bit message of FIG. 3) to the set top box 1000 (2230). Therefore, the set top box 1000 changes the setting to the shift operation mode (for example, the passive standby mode in the drawing) (2240) and the set top box power management server 900 manages that the set top box 1000 is in the shift operation mode (for example, the passive standby mode in the drawing) (2250).

In this case, when the communication dedicated low power processor 1130 of the set top box 1000 is supported, even in the passive standby mode 1170 (a network connected passive standby mode), the set top box power management server 900 and the set top box 1000 periodically exchange the passive standby mode heart bit message to share the status information. For example, the set top box power management server 900 transmits the passive standby mode heart bit message including information on the timer value Tps (timer passive standby) notifying the current operation mode, the shift operation mode which is the passive standby mode, and the generation cycle of the heart bit message to the set top box 1000 and the set top box 1000 transmits the heart bit message including information on whether to be the normal operation status and the passive standby mode to the set top box power management server

900. Here, when the message exchanging operation (2260) is not normally performed so that the set top box power management server 900 does not receive the heart bit message from the set top box 1000 during a predetermined time within the given cycle, or if necessary, the set top box power management server 900 transmits a message (see a reset command of the heart bit message of FIG. 3) for initializing (resetting) the set top box 1000 to the set top box 1000 (2270), to control the set top box 1000 to perform a reset process which turns off all power devices and then reboots the power devices. Here, even though it is described that the "shift" is distinguished from "reset", "reset" may be included in the concept of the operation mode or the operation state shift.

Further, in an example (5300) of shifting a watching pattern based operation mode, when a user wants to watch the pay TV, the multimedia processing processor 1100 of the set top box 1000 may transmit a pay TV service request message which requests a pay TV service to the content guide server 400 (2300). In order to respond thereto, the content guide server 400 may manage a pay TV watching history for the set top box 1000 in advance. The content guide server 400 interworks with the set top box 1000 to exchange a necessary signal, so that watching pattern information such as a time zone when the subscriber or the user watches the pay TV through the set top box 1000, a program genre, or a watching time length is obtained and the watching pattern information for every set top box is recorded and managed in a database. The content guide server 400 analyzes the watching pattern information to extract a broadcasting time of a program which is expected to be watched by the user and calculates information on an operation time when the set top box 1000 operates in a predetermined operation mode based on the broadcasting time to transmit the information to the set top box power management server 900 (2310). Therefore, the set top box power management server 900 receives the operation time information and then transmits a message (a heart bit message is available) including information on a mode shift timer value corresponding to the operation time information to the set top box 1000 with reference to the current operation mode of the set top box 1000 which is managed (2320). When the timer is set (2330) by the timer setting block 1122 and the setting time of the timer expires, the set top box 1000 which receives the message may be driven in a required operation mode, that is, the passive standby mode, the active standby mode, or the on mode which is required in accordance with the control of the power supply of the power control block 1121 (2340, 2350, and 2360).

Figure 5:
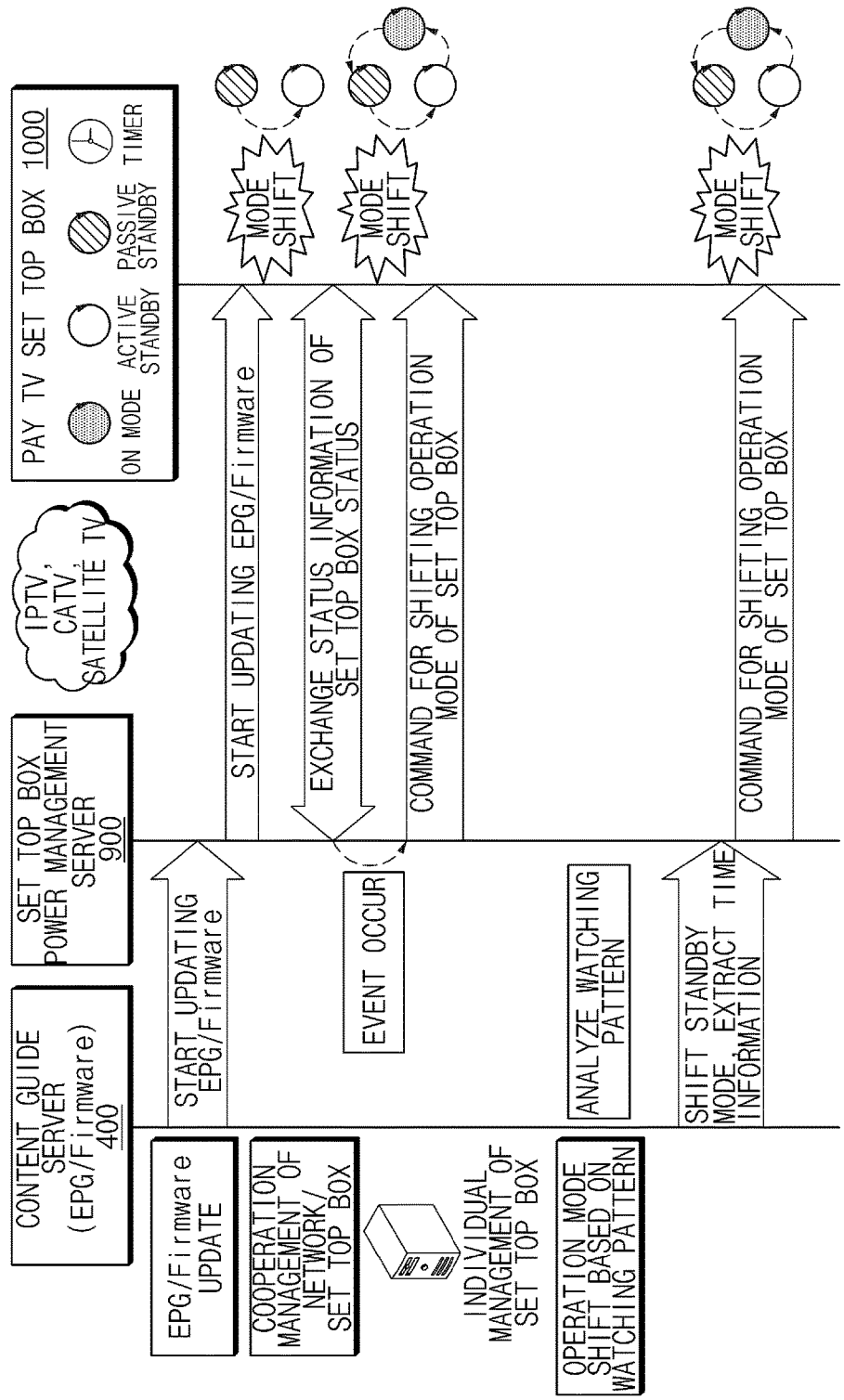
FIG. 5 is a conceptual diagram of operation mode shift of a set top box based on network cooperation according to an exemplary embodiment of the present invention.

FIG. 5 illustrates a conceptual diagram of operation mode shift of a set top box 1000 based on network cooperation according to an exemplary embodiment of the present invention.

Referring to FIG. 5, basically, the set top box power management server 900, as described in the example 5100, interworks with the content guide server 400 (or may be separately configured by the EPG server, the firmware server, or the content server) which is pay TV equipment to update the EPG or firmware information of the set top box 1000. When the operation mode of the set top box 1000 is not in a mode for updating the EPG and the firmware, for example, when the set top box 1000 is in the passive standby mode or the communication dedicated low power processor 1130 is not supported in the passive standby mode 1170, the set top box power management server 900 transmits the time information from the content guide server 400 to the set top box 1000 and shifts the mode into the active standby mode 1160 or the on mode 1150 and then transmits the EPG or firmware information to the set top box 1000 to update the information.

Further, as described in the example 5200, the set top box power management server 900 controls to periodically exchange the heart bit message with the set top box 1000 in order to manage the status information of the set top box and when an event in which the set top box 1000 is in the abnormal status occurs, for example, when the heart bit message exchanging operation is not normally performed so that the set top box power management server 900 does not receive the heart bit message from the set top box 1000 during a predetermined time within the given cycle or if necessary, the set top box power management server 900 transmits a forcible shift message to shift the operation mode of the set top box 1000 and transmits a message for initializing the set top box to the set top box 1000 to perform the initializing process.

Further, the set top box power management server 900 interworks with the content guide server 400 as described in the example 5300, to analyze and manage the watching pattern (for example, a pay TV watching time zone, a program genre, or a watching time length) of the set top box 1000 and transmits the operation time information at which the set top box 1000 needs to operate based thereon to the set top box power management server 900, thereby shifting the operation status such that the set top box 1000 operates in a necessary operation mode, that is, the passive standby mode, the active standby mode, or the on mode.

FIG. 6 illustrates a data structure for managing a status of a set top box in a set top box power management server (or device) 900 which interworks with a set top box 1000 based on network cooperation according to an exemplary embodiment of the present invention.

Referring to FIG. 6, the set top box power management server 900 interworks with the set top box 1000 to manage operation status information for every set top box of a subscriber in the database (DB) 902 based on the transmitted/received message or the input information of the operator. The operation status mode for every set top box of a subscriber may include a unique number (for example, an MAC address) 910 for each set top box, attribute information 920 indicating whether the set top box possesses (921) or does not possess (922) the communication dedicated low power processor, timer value information 930 for an operation mode shift timer value of the set top box or a heart bit message generation cycle of the current operation mode, and information on the operation status such as the on mode 940, the active standby mode 950, the passive standby mode 960, an abnormal event generated status 970, or the off mode 980 as a current operation status of the set top box.

The set top box power management unit 903 which is provided in the set top box power management server 900 refers to the database (DB) of FIG. 6 to control the power of the set top box 1000. The set top box power management unit 903 may be implemented by hardware, software, or a combination thereof.

FIG. 7 is a flowchart explaining an operational procedure for managing a status of a set top box 1000 in a set top box power management server 900 according to an exemplary embodiment of the present invention. An operation of FIG. 7 may be performed by the set top box power management unit 903 provided in the set top box power management server 900 with reference to the database (DB) illustrated in FIG. 6.

Referring to FIG. 7, first, when the set top box power management server 900 is turned on to start an operation (3000), the set top box power management unit 903 may receive a heart bit message from the each set up box (3020) in order to manage a plurality of set top boxes provided on the network (3010). The set top box power management unit 903 consistently analyzes the received heart bit message to determine whether to be the on mode (3030) and when the mode is not the on mode, the set top box power management unit 903 determines whether to be the active standby mode (3040) or the passive standby mode (3090).

Specifically, when the set top box 1000 is in the active standby mode (3040), the set top box power management unit 903 sets a time value Tas (timer active standby) indicating the active standby mode heart bit message generation cycle (3050) to determine whether a normal active standby mode heart bit message is periodically received in accordance with the timer value Tas from the set top box 1000 to monitor whether the operation mode of the set top box 1000 is in the normal active mode status (3060). The set top box power management unit 903 periodically receives the active standby mode heart bit message from the set top box 1000 whenever the timer value Tas set in the timer expires. However, when the set top box power management unit does not receive the active standby mode heart bit message even after the timer value Tas set in the timer expires, the set top box power management unit 903 determines that an abnormal event occurs in the set top box 1000 to transmit the forcible shift message (see the shift operation mode of the heart bit message of FIG. 3), thereby forcibly shifting the operation mode of the set top box 1000 into the passive standby mode (3080).

Further, when the set top box 1000 is in the (network connected) passive standby mode (3090), the set top box power management unit 903 sets a time value Tps (timer passive standby) indicating the passive standby mode heart bit message generation cycle (3100) to determine whether a normal passive standby mode heart bit message is periodically received in accordance with the timer value Tps from the set top box 1000 to monitor whether the operation mode of the set top box 1000 is in the normal passive mode status (3110). The set top box power management unit 903 periodically receives the passive standby mode heart bit message from the set top box 1000 whenever the timer value Tps set in the timer expires. However, when the set top box power management unit 903 does not receive the passive standby mode heart bit message even after the timer value Tps set in the timer expires, the set top box power management unit 903 determines that an abnormal event occurs in the set top box 1000 to transmit an initializing message (see the reset command of the heart bit message of FIG. 3), thereby forcibly shifting the operation mode of the set top box 1000 into the reset mode (3130).

Figure 8:
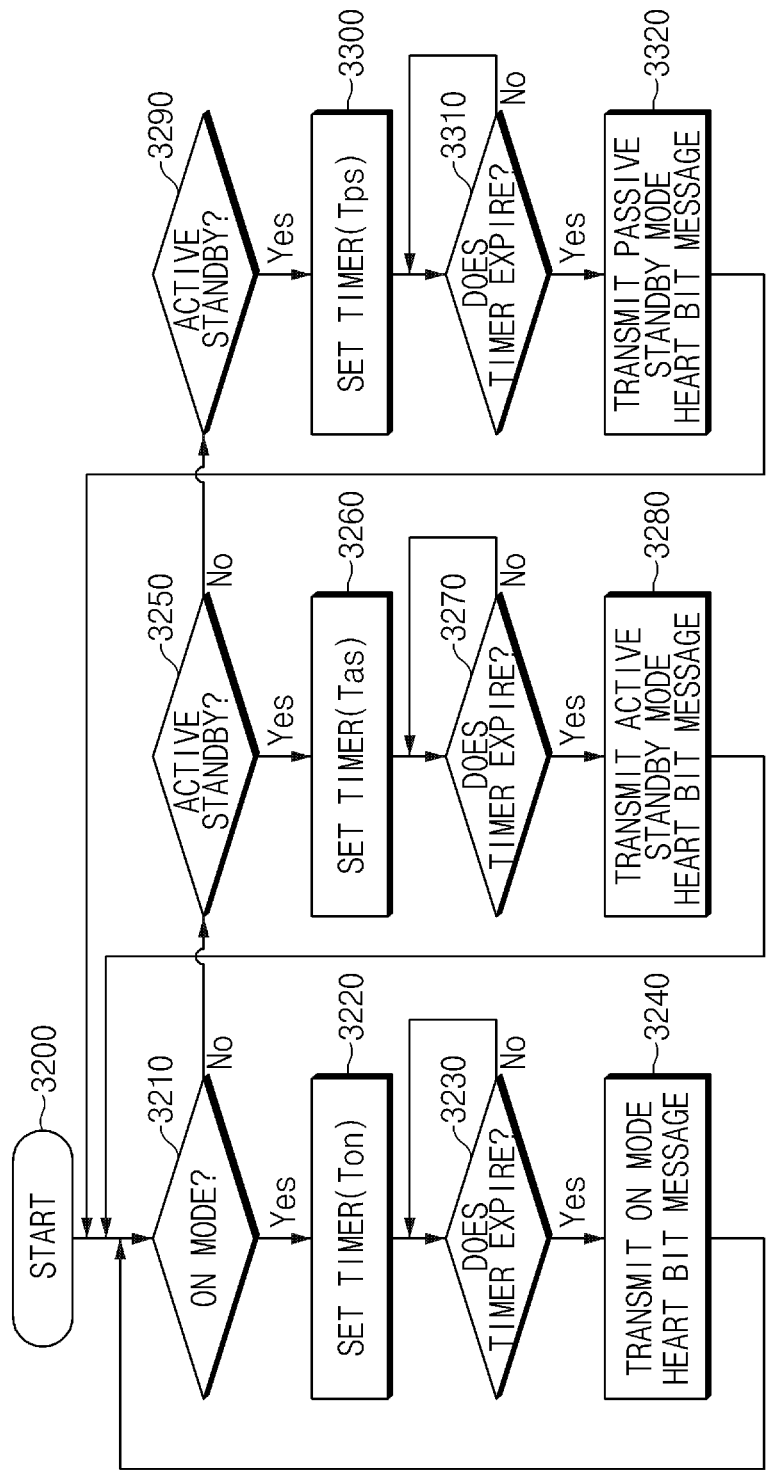
FIG. 8 is a flowchart explaining an operation procedure of a set top box based on network cooperation according to an exemplary embodiment of the present invention.

FIG. 8 is a flowchart explaining an operation procedure of a set top box 1000 based on network cooperation according to an exemplary embodiment of the present invention.

Referring to FIG. 8, first, when the set top box 1000 is turned on to start the operation (3200), the set top box 1000 determines whether to be the on mode (3210) in accordance with a setting of the user or the heart bit message received from the set top box power management server 900 and when the mode is not the on mode, determines whether to be the active standby mode (3250) or the passive standby mode (3290), to transmit the heart bit message to the set top box power management server 900 in accordance with the mode, as described below.

When the set top box 1000 is in the on mode (3210), the set top box 1000 sets a timer value Ton (timer on) indicating the on mode heart bit message generation cycle to the timer (3220) and periodically transmits the on mode heart bit message to the set top box power management server 900 (3240) whenever the timer value Ton set in the time expires (3220).

Further, when the set top box 1000 is in the active standby mode (3250), the set top box 1000 sets a timer value Tas (timer active standby) indicating the active standby mode heart bit message generation cycle in the timer (3260) and periodically transmits the active standby mode heart bit message to the set top box power management server 900 (3280) whenever the timer value Tas set in the time expires (3270).

Further, when the set top box 1000 is in the passive standby mode (network connected passive standby mode) (3290), the set top box 1000 sets a timer value Tps (timer passive standby) indicating the passive standby mode heart bit message generation cycle in the timer (3300) and periodically transmits the passive standby mode heart bit message to the set top box power management server 900 (3320) whenever the timer value Tps set to the time expires (3310).

Figure 9:
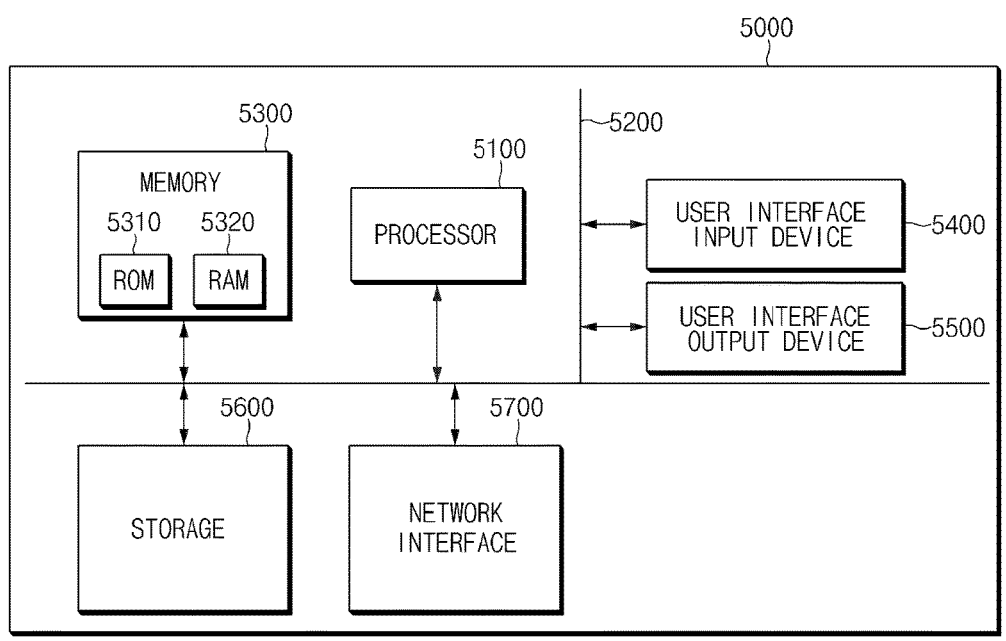
FIG. 9 is a view explaining an example of an implementing method of a set top box according to an exemplary embodiment of the present invention and network equipment of a pay TV service provider.

FIG. 9 is a view explaining an example of an implementing method of a set top box 1000 according to an exemplary embodiment of the present invention and network equipment of a pay TV service provider. The set top box 1000 and the network equipment of the pay TV service provider according to the exemplary embodiment of the present invention may be configured by hardware, software, or a combination thereof. For example, the set top box 1000 and the network equipment of the pay TV service provider may be implemented to include a processing system 5000 as illustrated in FIG. 9.

The processing system 5000 may include at least one processor 5100, a memory 5300, a user interface input device 5400, a user interface output device 5500, a storage 5600, and a network interface 5700 which are connected to each other through a bus 5200. The processor 5100 may be a central processing unit (CPU) and a semiconductor device which may perform processings on commands which are stored in the memory 5300 and/or the storage 5600. The memory 5300 and the storage 5600 may include various types of volatile or non-volatile storage media. For example, the memory 5300 may include a read only memory (ROM) and a random access memory (RAM).

The method or a step of an algorithm which has been described regarding the exemplary embodiments disclosed in the specification may be directly implemented by hardware or a software module which is executed by a processor 5100 or a combination thereof. The software module may be stored in a storage medium (that is, the memory 5300 and/or the storage 5600) such as a RAM, a flash memory, a ROM, an EPROM, an EEPROM, a register, a hard disk, a detachable disk, or a CD-ROM. An exemplary storage medium is coupled to the processor 5100 and the processor 5100 may read information from the storage medium and write information in the storage medium. As another method, the storage medium may be integrated with the processor 5100. The processor and the storage medium may be stored in an application specific integrated circuit (ASIC). The ASIC may be stored in a user terminal. As another method, the processor and the storage medium may be stored in a user terminal as individual components.

As described above, a structure of a low power set top box 1000 based on the network cooperation of the present invention is configured by a structure which controls the operation mode of the set top box dedicated multimedia processing processor (SoC: system on chip) 1100 which processes the broadcast contents and the broadcast protocol and the peripheral device 1140 while the user gets out of the on mode in which the user normally watches the pay TV and does not watch the pay TV to perform only necessary functions and optimizes the shift of the standby mode through cooperation between the pay TV network and the set top box 1000, in order to minimize the power consumption of the set top box required to watch the pay TV.

That is, in the present invention, the standby mode of the set top box 1000 is classified into the active standby mode and the passive standby mode and in the active standby mode, the set top box is maintained in a state which is connected to the pay TV network to perform a background function of processing the broadcast protocol or updating the EPG. The passive standby mode which does not perform the main function and the background function is classified into a standalone passive standby mode which is maintained in a state to be shifted into the active standby mode and the on mode by the operation of the remote controller and the timer in a state where the communication is disconnected between the set top box and the pay TV network and a network connected passive standby mode which is maintained in the communication state with the network. In the present invention, under assumption that the network connected passive standby mode is used, idle power consumption of the set top box is minimized through the cooperation between the pay TV network and the set top box.

According to the low power pay TV set top box 1000 based on network cooperation according to the present invention, when it is required to update an EPG or an abnormal heart bit message in the active standby mode is received through the cooperation between the pay TV network and the set top box 1000, or in accordance with a service request, watching patterns of a user are analyzed to be shifted from the active standby mode (a background function such as broadcasting protocol processing or EPG updating is available) to the manual standby mode (the main function and the background function are not allowed) at the corresponding time, to extend a time to maintain the manual standby mode in which power consumption is low, thereby reducing average power consumption in the standby mode of the set top box. Therefore, plant building may be reduced in nation-wide. Further, service providers remotely control set top boxes of subscribers in a pay TV network, so that power consumption of the set top box may be reduced as described above and abnormality of the set top box is discovered and handled at an early stage, so that the overall benefit may be increased.

It will be appreciated that various exemplary embodiments of the present invention have been described herein for purposes of illustration, and that various modifications, changes, and substitutions may be made by those skilled in the art without departing from the scope and spirit of the present invention.

Accordingly, the exemplary embodiments disclosed herein are intended to not limit but describe the technical spirit of the present invention and the scope of the technical spirit of the present invention is not restricted by the exemplary embodiments. The protection scope of the present invention should be interpreted based on the following appended claims and it should be appreciated that all technical spirit included within a range equivalent thereto is included in the protection scope of the present invention.

What is claimed is:

1. A set top box control method based on network cooperation, the method comprising:

periodically transmitting, by at least one set top box, an operation status message indicating an operation status of the at least one set top box in accordance with a message generation cycle set in accordance with a control message received from a power management server on a network to the power management server;

periodically transmitting, by the power management server, the control message to the at least one set top box in accordance with the message generation cycle of the control message, managing operation status information for the at least one set top box in accordance with the operation status message indicating the operation status of the at least one set top box received from the at least one set top box in a database, and monitoring the operation status of the at least one set top box in accordance with the control message;

in response to the generation period expires but the operation status message indicating the operation status of a corresponding set top box corresponding to a current operation mode of the corresponding set top box is not received, transmitting, by the power management server, a message for shifting an operation mode to the corresponding set top box;

analyzing, by the power management server, watching patterns of a user related with the corresponding set top box and obtaining watching pattern information including a time zone when a broadcast television program is watched in the corresponding set top box; and shifting, by the corresponding set top box, the operation mode of the corresponding set top box in accordance with the message and the watching pattern information, wherein the operation mode of the corresponding set top box includes an on mode and an off mode and further includes an active standby mode and a passive standby mode depending on whether to support a background function, and wherein the shifting of the operation mode includes performing, by the corresponding set top box, a resetting process of turning off all power devices and rebooting the all power devices in accordance with the message in response to the power management server does not receive the operation status message on the operation status of the network connected passive standby mode of the corresponding set top box.

2. The set top box control method of claim 1, wherein the passive standby mode includes a standalone passive standby mode and the network connected passive standby mode which maintains a communication status with a network device including the power management server in accordance with an operation of a communication dedicated processor of the corresponding set top box.

3. The set top box control method of claim 1, wherein the operation status message indicating the operating status of the at least one set top box which is transmitted from the at least one set top box includes a set top box unique address, a current operation mode, or information on a normal or abnormal operation status.

4. The set top box control method of claim 1, wherein the control message which is transmitted from the power management server includes information on a set top box unique address, an operation mode shifting command of the corresponding set top box, a current operation mode, an operation mode to be shifted, a timer value for a shifting time of the operation mode or the message generation cycle, a set top box reset command, and information on a normal or abnormal operation status of the corresponding set top box.

5. The set top box control method of claim 1, wherein the shifting of the operation mode includes shifting, by the corresponding set top box, the operation mode into another operation mode among the on mode, the active standby mode, or the passive standby mode in accordance with the message in response to the power management server does not receive a the operation status message on any one operation status among the on mode, the active standby mode, and the passive standby mode of the corresponding set top box.

6. The set top box control method of claim 1, wherein the power management server remotely controls the corresponding set top box on the network to operate in the passive standby mode longer than in the active standby mode to reduce power consumption of the corresponding set top box.

7. The set top box control method of claim 1, further comprising: shifting, by the corresponding set top box, the operation mode in accordance with the timer time and the operation mode which is input by manipulating the remote controller by the user.

8. The set top box control method of claim 1, further comprising: transmitting, by the power management server, a message including a timer time information to update electronic program guide (EPG) information or the firmware and control the at least one set top box to shift the passive standby mode into the active standby mode at the corresponding time, and then transmitting EPG update or firmware update after the time, to control the at least one set top box to update the EPG information or the firmware.

9. The set top box control method of claim 1, further comprising: transmitting the control message including the operation time information for a predetermined operation mode of the at least one set top box obtained by analyzing and calculating broadcast time of a program which is expected to be watched by the user to the at least one set top box, setting, by the at least one set top box, a time in a timer to shift the operation mode into on mode, active standby mode, or passive standby mode when the set time of the timer expires.

10. A set top box power management device for controlling at least one set top box based on network cooperation, the set top box power management device comprising:
a database which stores operation status information for the at least one set top box on a network; and
a set top box power management unit which interworks with the at least one set top box to periodically exchange messages, periodically transmits a control message to the at least one set top box in accordance with a message generation cycle of the control message, receives an operation status message on an operation status of the at least one set top box which is periodically transmitted by the at least one set top box in accordance with the message generation cycle set in accordance with the control message to manage the operation status information for the at least one set top box by the database and monitor the operation status of the at least one set top box in accordance with the control message,
wherein in response to the set top box power management unit does not receive the operation status message on the operation status of a corresponding set top box corresponding to a current operation mode of the corresponding set top box at a time when the message generation cycle expires, with reference to the database, the set top box power management unit transmits a message for shifting the an operation mode to the corresponding set top box,
wherein the set top box power management unit analyzes watching patterns of a user related with the corresponding set top box, obtains watching pattern information including a time zone when a broadcast television program is watched in the corresponding set top box, and controls shifting the operation mode of the corresponding set top box based on the watching pattern information, wherein the operation mode of the at least one set top box includes an on mode and an off mode and further includes an active standby mode and a passive standby mode depending on whether to support a background function, and wherein the shifting of the operation mode includes performing, by the corresponding set top box, a resetting process of turning off all power devices and rebooting the all power devices in accordance with the message in response to the power management server does not receive the operation status message on the operation status of the network connected passive standby mode of the corresponding set top box.

11. The set top box power management device of claim 10, wherein the set top box power management unit, when the operation status message on any one operation status of the on mode, the active standby mode, and the passive standby mode of the corresponding set top box is not received, transmits the message which shifts the operation mode of the corresponding set top box into another operation mode.

12. The set top box power management device of claim 10, wherein the set top box power management unit transmits a message including timer time information to control a mode to be shifted from the passive standby mode into the active standby mode at a time by the corresponding set top box and then transmits an EPG update or a firmware update after the time, so that the corresponding set top box is controlled to update the EPG information or the firmware.

13. The set top box power management device of claim 10, wherein the set top box power management unit transmits the message including the operation time information for a predetermined operation mode of the corresponding set top box obtained by analyzing and calculating broadcast time of a program which is expected to be watched by the user to the corresponding set top box, controls the corresponding set top box to set a time in a timer and shift the operation mode into the on mode, the active standby mode, or the passive standby mode when the set time of the timer expires.

14. A set top box based on network cooperation, comprising:
a timer;
a power management unit which interworks with a power management server on a network to periodically exchange messages and periodically transmits an operation status message on an operation status of the set top box in accordance with a message generation cycle set in the timer in accordance with a control message received from the power management server,
wherein the power management unit includes a timer setting block which sets the message generation cycle to the timer in accordance with the control message; and
a power control block which controls a power device based on an operation mode, in accordance with the control message for shifting a transmitted operation mode in response to the power management server does not receive the operation status message on the operation status of the set top box corresponding to a current operation mode of the set top box when a generation cycle of the control message expires, wherein the power management server receives the operation status message on an operation status of the set top box to manage the operation status message in a database and monitors an operation state of the set top box in accordance with the control message, wherein the power management unit receives watching pattern information of a user from the power management server and controls shifting the operation mode of the set top box based on the watching pattern information, wherein the watching pattern information including a time zone when a broadcast television program is watched in the set top box, wherein the operation mode of the set top box includes an on mode and an off mode and further includes an active standby mode and a passive standby mode depending on whether to support a background function, and wherein the shifting of the operation mode includes performing, by the set top box, a resetting process of turning off all power devices and rebooting the all power devices in accordance with the control message when the power management server does not receive the operation status message on the operation status of the network connected passive standby mode of the set top box.

\* \* \* \* \*